(12) United States Patent
Slaughter et al.

(10) Patent No.: US 6,421,787 B1
(45) Date of Patent: Jul. 16, 2002

(54) HIGHLY AVAILABLE CLUSTER MESSAGE PASSING FACILITY

(75) Inventors: Gregory L. Slaughter, Palo Alto, CA (US); Robert Herndon, Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/076,274

(22) Filed: May 12, 1998

(51) Int. Cl.$^7$ ................................................. G06F 11/00
(52) U.S. Cl. ............................................ 714/4; 714/11
(58) Field of Search ................................ 714/4, 5, 7, 8, 714/2, 25, 27, 31, 32, 39, 43, 44, 770, 769, 9, 10, 11, 13; 711/202, 114; 709/216, 223, 219; 707/1, 10

(56) References Cited

U.S. PATENT DOCUMENTS

| | | | |
|---|---|---|---|
| 4,800,488 A | * 1/1989 | Agrawal et al. | 364/200 |
| 5,084,816 A | * 1/1992 | Boese et al. | 395/575 |
| 5,438,508 A | 8/1995 | Wyman | 364/401 |
| 5,475,813 A | 12/1995 | Cieslak et al. | 395/182.02 |
| 5,634,096 A | * 5/1997 | Baylor et al. | 395/182.04 |
| 5,666,486 A | 9/1997 | Alfieri et al. | 395/200.47 |
| 5,668,943 A | * 9/1997 | Attanasio et al. | 395/182.05 |
| 5,734,909 A | * 3/1998 | Bennett | 395/726 |
| 5,754,829 A | * 5/1998 | Motohiro et al. | 395/500 |
| 5,778,168 A | * 7/1998 | Fuller | 395/182.16 |

(List continued on next page.)

FOREIGN PATENT DOCUMENTS

EP       0 709 779       5/1996

OTHER PUBLICATIONS

Shared Virtual Disk for a Cluster of Processors with Separate I/O Devices and Shared Memeory, IBM Technical Disclosure Bulletin, vol. 36, No. 06B, Jun. 1993, pp. 375–377.

High Availability Cluster Multi–Processing 4.1 for AIX, HANFS for AIX Installation and Administration Guide, First Edition (Dec. 1995), Copyright International Business Machine Corporation 1995., pp. 5–1—5–10, 9–1—9–10 (14 pages).

"rfc1094," Sun Microsystems, Inc., http://www.cis.ohio–state.edu/htbin/rfc/rfc1094.html, 10/29/98 3:18 PM.

"Proceedings of the Winter 1991 USENIX Conference," USENIX Association, Jan. 21—Jan. 25, 1991 Dallas, Texas, USA, (8 pages).

*Primary Examiner*—Nadeem Iqbal
(74) *Attorney, Agent, or Firm*—Conley, Rose & Tayon, PC; B. Noël Kivlin

(57) ABSTRACT

A cluster implements a virtual disk system that provides each node of the cluster access to each storage device of the cluster. The virtual disk system provides high availability such that a storage device may be accessed and data access requests are reliably completed even in the presence of a failure. To ensure consistent mapping and file permission data among the nodes, data are stored in a highly available cluster database. Because the cluster database provides consistent data to the nodes even in the presence of a failure, each node will have consistent mapping and file permission data. A cluster transport interface is provided that establishes links between the nodes and manages the links. Messages received by the cluster transports interface are conveyed to the destination node via one or more links. The configuration of a cluster may be modified during operation. Prior to modifying the configuration, a reconfiguration procedure suspends data access requests and waits for pending data access requests to complete. The reconfiguration is performed and the mapping is modified to reflect the new configuration. The node then updates the internal representation of the mapping and resumes issuing data access requests.

39 Claims, 13 Drawing Sheets

U.S. PATENT DOCUMENTS

| | | | | |
|---|---|---|---|---|
| 5,805,785 A | * | 9/1998 | Dias et al. | 395/182.02 |
| 5,809,285 A | * | 9/1998 | Hilland | 395/500 |
| 5,815,649 A | * | 9/1998 | Utter et al. | 395/112.04 |
| 5,828,876 A | | 10/1998 | Fish et al. | 395/601 |
| 5,964,886 A | * | 10/1999 | Slaughter et al. | 714/4 |
| 5,996,087 A | * | 11/1999 | Badovinatz et al. | 714/4 |
| 5,999,712 A | * | 12/1999 | Moiin et al. | 395/200.5 |
| 6,009,455 A | * | 12/1999 | Doyle | 709/201 |
| 6,058,426 A | * | 5/2000 | Godwin et al. | 709/229 |
| 6,067,545 A | * | 5/2000 | Wolff | 707/10 |
| 6,078,990 A | * | 6/2000 | Frazier | 711/114 |

* cited by examiner

HIGHLY AVAILABLE CLUSTER MESSAGE PASSING FACILITY

BACKGROUND OF THE INVENTION

1. Field of the Invention

This invention relates to the field of distributed computing systems and, more particularly, to distributed virtual storage devices.

2. Description of the Related Art

Distributed computing systems, such as clusters, may include two or more nodes, which may be employed to perform a computing task. Generally speaking, a node is a group of circuitry designed to perform one or more computing tasks. A node may include one or more processors, a memory and interface circuitry. Generally speaking, a cluster is a group of two or more nodes that have the capability of exchanging data between nodes. A particular computing task may be performed upon one node, while other nodes perform unrelated computing tasks. Alternatively, components of a particular computing task may be distributed among the nodes to decrease the time required perform the computing task as a whole. Generally speaking, a processor is a device configured to perform an operation upon one more operands to produce a result. The operations may be performed in response to instructions executed by the processor.

Nodes within a cluster may have one or more storage devices coupled to the nodes. Generally speaking, a storage device is a persistent device capable of storing large amounts of data. For example, a storage device may be a magnetic storage device such as a disk device, or optical storage device such as a compact disc device. Although a disk device is only one example of a storage device, the term "disk" may be used interchangeably with "storage device" throughout this specification. Nodes physically connected to a storage device may access the storage device directly. A storage device may be physically connected to one or more nodes of a cluster, but the storage device may not be physically connected to all the nodes of a cluster. The nodes which are not physically connected to a storage device may not access that storage device directly. In some clusters, a node not physically connected to a storage device may indirectly access the storage device via a data communication link connecting the nodes.

It may be advantageous to allow a node to access any storage device within a cluster as if the storage device is physically connected to the node. For example, some applications, such as the Oracle Parallel Server, may require all storage devices in a cluster to be accessed via normal storage device semantics, e.g., Unix device semantics. The storage devices that are not physically connected to a node, but which appear to be physically connected to a node, are called virtual devices, or virtual disks. Generally speaking, a distributed virtual disk system is a software program operating on two or more nodes which provides an interface between a client and one or more storage devices, and presents the appearance that the one or more storage devices are directly connected to the nodes. Generally speaking, a client is a program or subroutine that accesses a program to initiate an action. A client may be an application program or an operating system subroutine.

Unfortunately, conventional virtual disk systems do not guarantee a consistent virtual disk mapping. Generally speaking, a storage device mapping identifies to which nodes a storage device is physically connected and which disk device on those nodes corresponds to the storage device. The node and disk device that map a virtual device to a storage device may be referred to as a node/disk pair. The virtual device mapping may also contain permissions and other information. It is desirable that the mapping is persistent in the event of failures, such as a node failure. A node is physically connected to a device if it can communicate with the device without the assistance of other nodes.

A cluster may implement a volume manager. A volume manager is a tool for managing the storage resources of the cluster. For example, a volume manager may mirror two storage devices to create one highly available volume. In another embodiment, a volume manager may implement striping, which is storing portions of files across multiple storage devices. Conventional virtual disk systems cannot support a volume manager layered either above or below the storage devices.

Other desirable features include high availability of data access requests such that data access requests are reliably performed in the presence of failures, such as a node failure or a storage device path failure. Generally speaking, a storage device path is a direct connection from a node to a storage device. Generally speaking, a data access request is a request to a storage device to read or write data.

In a virtual disk system, multiple nodes may have representations of a storage device. Unfortunately, conventional systems do not provide a reliable means of ensuring that the representations on each node have consistent permission data. Generally speaking, permission data identify which users have permission to access devices, directories or files. Permissions may include read permission, write permission or execute permission.

Still further, it is desirable to have the capability of adding or removing nodes from a cluster or to change the connection of existing nodes to storage devices while the cluster is operating. This capability is particularly important in clusters used in critical applications in which the cluster cannot be brought down. This capability allows physical resources (such as nodes and storage devices) to be added to the system, or repair and replacement to be accomplished without compromising data access requests within the cluster.

SUMMARY OF THE INVENTION

The problems outlined above are in large part solved by a highly available virtual disk system in accordance with the present invention. In one embodiment, the highly available virtual disk system provides an interface between each storage device and each node in the cluster. From the node's perspective, it appears that each storage device is physically connected to the node. If a node is physically connected to a storage device, the virtual disk system directly accesses the storage device. Alternatively, if the node is not physically connected to a storage device, the virtual disk system accesses the storage device through another node in the cluster that is physically connected to the storage device. In one embodiment, the nodes communicate through a data communication link. Whether a storage device is directly accessed or accessed via another node is transparent to the client accessing the storage device.

In one embodiment, the nodes store a mapping of virtual disks to storage devices. For example, each active node may store a mapping identifying a primary node/disk pair and a secondary node/disk pair for each virtual device. Each node/disk pair identifies a node physically coupled to the storage device and a disk device on that node that corresponds to the storage device. The secondary node/disk pair may also be referred to as an alternate node/disk pair. If the node is unable to access a storage device via the primary node/disk pair, the node may retry the data access request via the secondary node/disk pair. To maintain a consistent mapping between the nodes in the presence of failures, the mapping may be stored in a highly available database. Because the highly available database maintains one consistent copy of data even in the presence of a failure, each node that queries the highly available database will get the same mapping. The highly available database may also be used to store permission data to control access to virtual devices. Because the highly available database maintains one consistent copy of permission data even in the presence of a failure, each node that queries the database will get the same permission data.

One feature of a virtual disk system in accordance with the present invention is the high availability of the system. In one embodiment, the virtual disk system stores all of the data access requests it receives and retries those requests if an error occurs. For example, the virtual disk system of a node that initiates a data access request, called a requesting node, may store all outstanding data requests. If the destination node, i.e. the node to which the data access request is directed, is unable to complete the data access request, an error indication may be returned to the requesting node and the requesting node may resend the data access request to an alternate node that is connected to the storage device. This error detection and retry is performed automatically and is transparent to the client. In another example, if a node failure occurs, the virtual disk system may receive a modified list of active nodes and resend incomplete data access requests to active nodes coupled to the storage device. This reconfiguration and retry also is transparent to the client.

Another feature of a virtual disk system in accordance with the present invention is the ability to reconfigure the cluster while the cluster is operating. When a cluster is reconfigured, the mapping of virtual disks to storage devices may be updated. To prevent errors, a synchronization command may be performed or operated to all the nodes of the cluster prior to updating the mapping. The synchronization command causes the nodes to stop issuing data access requests. After the mapping is updated, another synchronization command causes the node to resume issuing data access requests.

The virtual disk system may be designed to serve as an interface between a volume manager and storage devices or between a client and a volume manager. In the former configuration, the client interfaces to the volume manager and the volume manager interfaces to the virtual disk system. In the latter configuration, the client interfaces to the virtual disk system and the virtual disk system interfaces to the volume manager.

Broadly speaking, the present invention contemplates a data transport interface of a distributed computing system including a configuration module and a connection module. The distributed computing system includes a first node, a second node, a third node and a data communication bus. The configuration module is configured to determine a number of active nodes of the distributed computing system and a number of links between the active nodes. The connection module is configured to receive data indicative of the number of active nodes and the number of links from the configuration module, to receive a request from a client to transfer data to a first active node, and to convey the data to the first active node via one or more of the links. When the number of active nodes changes, the configuration module notifies the connection module of the change and the connection module is configured to modify the links to the active nodes transparent to the client.

The present invention further contemplates a method of transporting data in a distributed computing system including a plurality of nodes and a data communication link, the method comprising: determining physical resources in the distributed computing system, wherein the physical resources include active nodes of the distributed computing system and active links between the active nodes; establishing a connection over the active links; receiving a data access request to convey data to a first of the active nodes; conveying the data over one or more of the active links to the first active node; determining that the physical resources have changed; and modifying links to the changed physical resources. The determination of change resources and the modifying of new links is transparent to a client.

The present invention still further contemplates a computer-readable storage medium comprising program instructions for transporting data in a distributed computing system comprising a plurality of nodes and data communication bus, wherein the program instructions execute on a first node or a second node of the distributed computing system and the program instructions are operable to implement the steps of: determining physical resources in the distributed computing system, wherein the physical resources include active nodes of the distributed computing system and active links between the active nodes; establishing a connection over the active links; receiving a data access request to convey data to a first of the active nodes; conveying the data over one or more of the active links to the first active node; determining that the physical resources have changed; and modifying links to the changed physical resources. The determination of change resources and the modifying of new links is transparent to a client.

BRIEF DESCRIPTION OF THE DRAWINGS

Other objects and advantages of the invention will become apparent upon reading the following detailed description and upon reference to the accompanying drawings in which.

Figure 1:
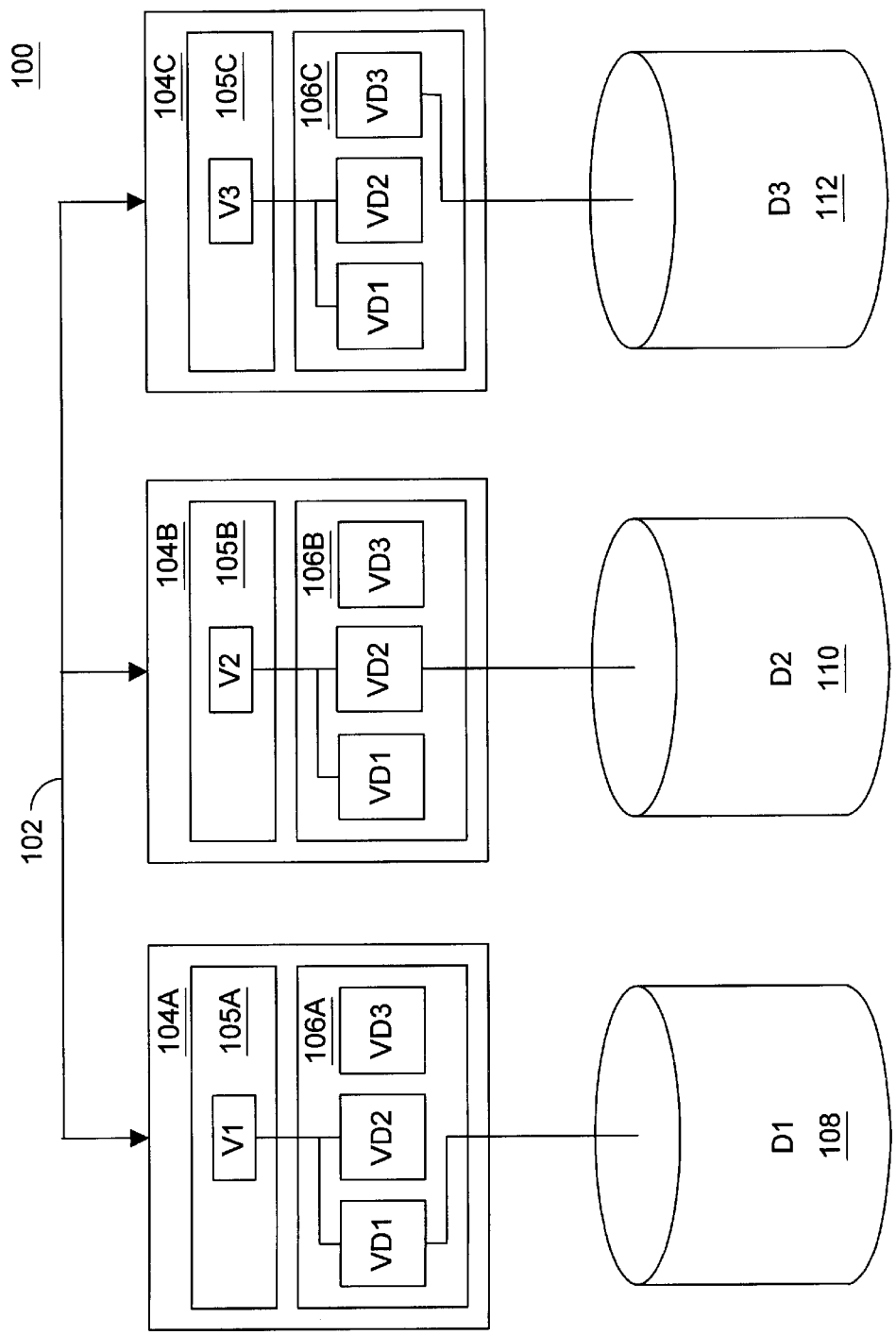
FIG. 1 is a block diagram of a cluster configuration according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now FIG. 1, a block diagram of a cluster configuration according to one embodiment of the present invention is shown. Cluster 100 includes a data communication link 102, three nodes 104A–104C, and three storage devices 108, 110 and 112. Data communication link 102 provides a data communication path for transferring data between the nodes. Data communication link 102 contemplates a multi-drop link or point-to-point links. For example, data communication link 102 may include three point-to-point links. A first link may provide a communication path between nodes 104A and 104B, a second link may provide a communication path between nodes 104A and 104C, and a third link may provide a communication path between nodes 104B and 104C. In one embodiment, data communication link 102 implements a scalable coherent interface (SCI). In one particular embodiment, the cluster implements a TCP/IP protocol for transferring data over the SCI. It is noted that three nodes are shown for illustrative purposes only. Other embodiments may employee more or less nodes.

In the illustrating embodiment, storage device 108 is physically connected to node 104A, storage device 110 is physically connected to node 104B and storage device 112 is physically connected to node 104C. Storage devices 108–112 typically have storage capacities that exceed the storage capacities of the memory of the nodes to which they are connected. Data may be stored in storage devices 108–112 which is not currently being used by a node, and data from the storage device may be stored, or cached, in the memory of the node when the data is needed. In the illustrated embodiment, the storage devices are physically connected to only one node. In alternative embodiments, a storage device may be physically connected to a plurality of nodes. Multiple physical connections allow a storage device to be accessed even if one node physically connected to the device fails or a storage device path fails.

Multiple instances of the same distributed program may operate on each node. For example, volume manager 105A and volume manager 105B are different instances of the same distributed volume manager program. These instances may communicate with each other via data communication link 102. Each instance is given the same reference number followed by a unique letter, e.g., 105A or 105B. For simplicity, the distributed program may be referred to collectively using only the reference number, e.g., volume manager 105.

Node 104A includes a volume manager 105A and a virtual disk system 106A. In the illustrated embodiment, virtual disk system 106A provides an interface between volume manager 105 and storage devices 108–112. From the perspective of volume manager 105A, each storage device appears to be physically connected to node 104A. Virtual disk system 106 is a distributed program operating on a plurality of nodes. In the illustrated embodiment, an instance of virtual disk system 106 is operating on each node. Virtual disk system 106A, which is the instance of virtual disk system 106 operating on node 104A, includes three virtual devices (VD1, VD2 and VD3) that represent storage devices 108–112, respectively. Volume manager 105 communicates to the virtual devices in the same manner that it communicates to storage devices physically connected to the node. In one embodiment, volume manager 105 uses Unix device driver semantics. Data access requests to storage device 108 (i.e VD1) are conveyed from virtual disk system 106A directly to storage device 108. Data access requests to storage devices 110 and 112 (i.e. VD2 and VD3) are conveyed over data communication link 102 to the respective nodes physically connected to those devices.

It is noted that the virtual disks on each node are distinct devices. For example, VD1 on nodes 104A, 104B and 104C are each a unique device managed by a unique device driver. Although the devices are unique, each VD1 device maps to the same physical storage device. In other words, writing data to VD1 on node 104A stores data to storage device 108 the same as writing data to VD1 on node 104B or 104C. It is further noted that each storage device may be physically connected to more than one node. In this case, each node physically connected to the device has a different device driver that interfaces to the storage device.

In the illustrated embodiment, volume 1 (V1) of volume manager 105A is coupled to VD1 and VD2. In one embodiment, volume manager 105A may mirror these devices. In alternative embodiments, volume manager 105A may include other volumes coupled to other virtual devices. For example, a second volume manager 105A may be coupled to VD2 and VD3.

In nodes 104B and 104C, the volume managers (105B and 105C) and virtual disk systems (106B and 106C) operated in substantially the same manner as volume manager 105A and virtual disk system 106A. In the illustrated embodiment, volume 2 (V2) of volume manager 105B is coupled to VD2 and VD3 of virtual disk system 106B. Virtual disk system 106B directly accesses storage device 110 and accesses storage device 112 via communication interface 102 and node 104C. Volume 3 (V3) of volume manager 105C is coupled to VD2 and VD3 of virtual disk system 106C. Virtual disk system 106C directly accesses storage device 112 and accesses storage device 110 via communication interface 102 and node 104B.

Figure 2:
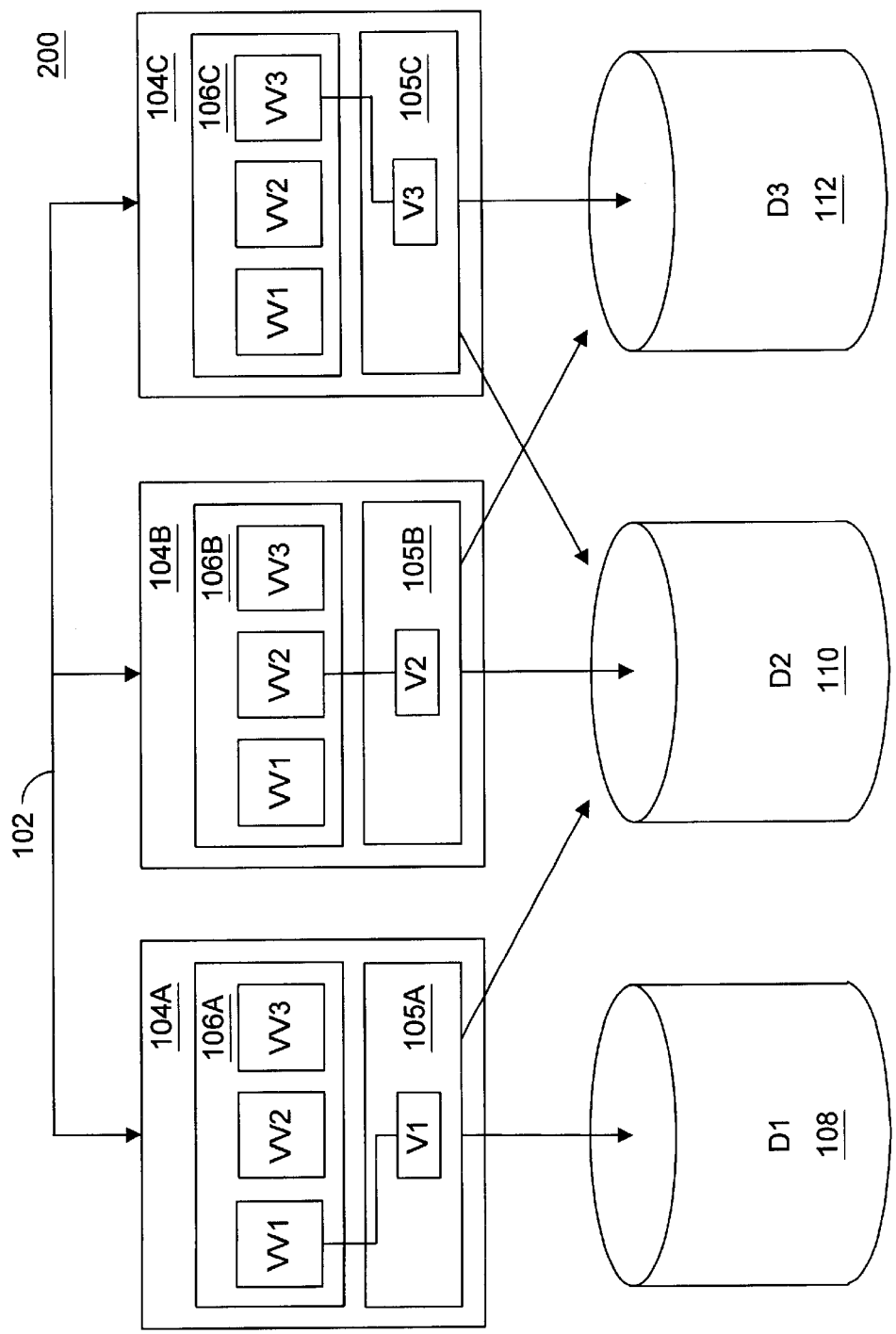
FIG. 2 is a block diagram of an alternative cluster configuration according to one embodiment of the present invention.

Turning now to FIG. 2, a block diagram of an alternative cluster configuration according to one embodiment of the present invention is shown. Cluster 200 includes a data communication link 102, three nodes 104A–104C, and three storage devices 108, 110 and 112. Components similar to those in FIG. 1 are given the same reference numerals for simplicity. In FIG. 2, the client interfaces to virtual disk system 106 rather than volume manager 105. The virtual disk system interfaces to the volume manager, which interfaces to one or more storage devices. In this configuration, volume manager 105 is layered below virtual disk system 106. For simplicity, only the operation of node 104A is discussed below. Nodes 104B and 104C operate in substantially the same manner.

In node 104A, the client interfaces to virtual disk system 106A. From the client's perspective, virtual disk system 106A appears as three separate storage devices. In FIG. 2, the three virtual devices are labeled as virtual volumes (VV1, VV2 and VV3) to reflect the layering of the volume manager below the virtual disk system. From the client's perspective, virtual volumes behave like a storage device. For example, the virtual volume may use Unix device driver semantics. The client may access any of the three volumes of the cluster from virtual disk system 106A. Volume manager 105A interfaces to the storage devices. In the illustrated embodiment, volume 1 (V1) of volume manager 105A is coupled to storage devices 108 and 110. In one embodiment, volume 1 may mirror data on storage devices 108 and 110. From the perspective of virtual disk system 106A, volume 1 of volume manager 105A behaves like a storage device. For example, the volume may behave like a Unix device driver.

Virtual volume 2 (VV2) of virtual disk system 106B interfaces directly to volume 2 (V2) of volume manager 105B. Virtual volumes 1 and 3 communicate with volume 1 of node 104A and volume 3 of node 105C via data communication link 102. In a similar manner, virtual volume 3 of virtual disk system 106C interfaces directly to volume 3 of volume manager 105C. Virtual volumes 1 and 2 communicate with volume 1 of node 104A and volume 2 of node 105B via data communication link 102. In the illustrated embodiment, volume 2 of volume manager 105B and volume 3 of volume manager 105C are both physically connected to storage devices 110 and 112.

The volume manager may be layered either above or below the virtual disk system because both the volume manager and the virtual disk system behave like storage devices. Accordingly, it is transparent to the client whether it interfaces to the volume manager or the virtual disk system. In both embodiments, the client appears to have direct access to three reliable storage devices. Both the volume manager and the virtual disk system may interface directly to a storage device. Some volume managers may operate better when layered above the virtual disk device. For example, a cluster volume manager, such as the Veritas CVM, operates best when layered above the virtual disk system, while non-distributed volume managers, such as Solstice Disk Suite (SDS), may be were required to operate below the virtual disk system. It is noted that a volume manager must be distributed to operate below the virtual disk system. It is further noted that a distributed volume manager, such as CVM, can manage the volumes (V1, V2 and V3) as though they are one volume, much like the virtual disk system manages the virtual disks on the nodes as though they are one device.

Figure 3:
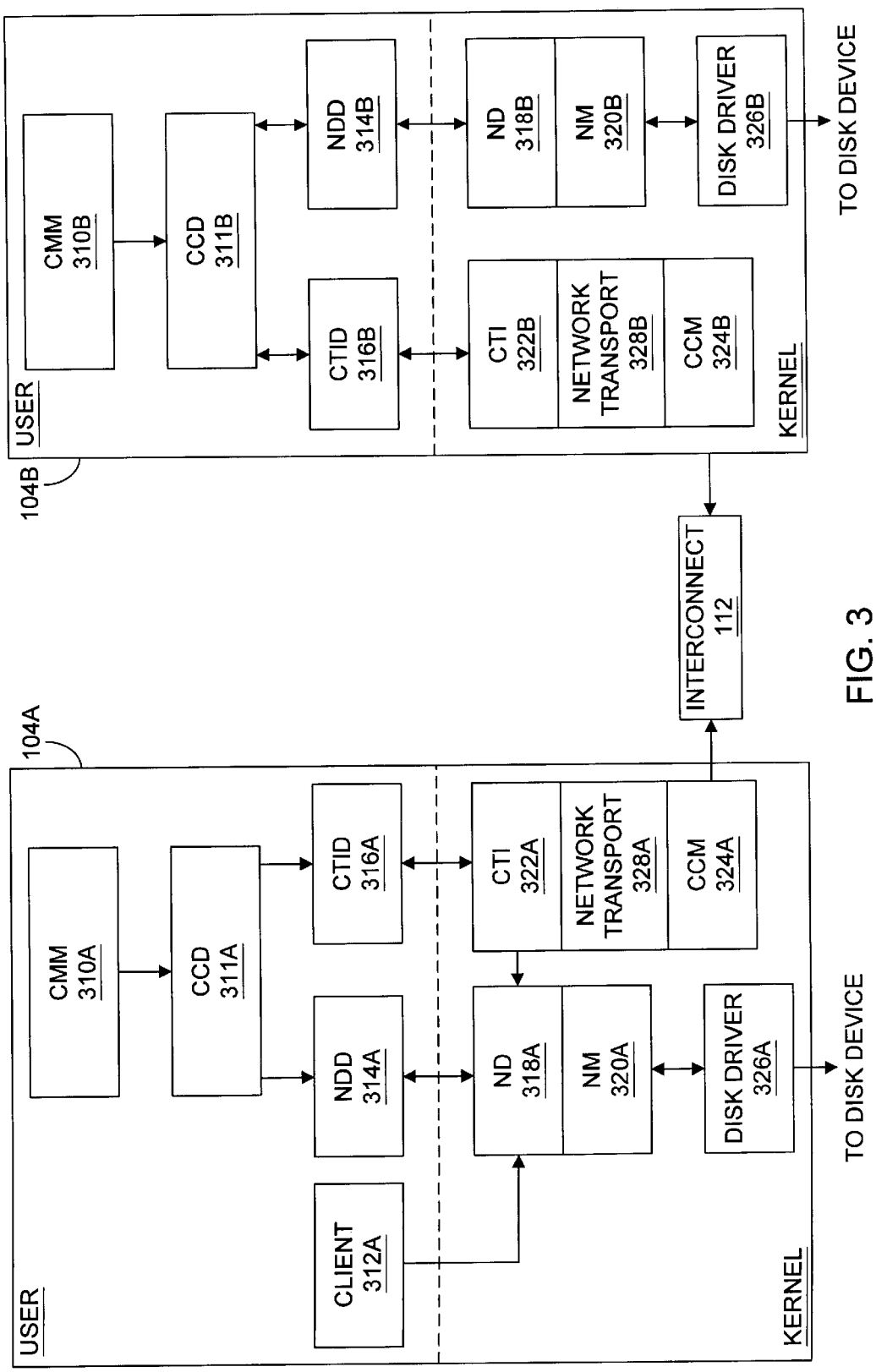
FIG. 3 is a block diagram of a virtual disk system operating on two nodes of a cluster according to one embodiment of the present invention.

Turning now to FIG. 3, a block diagram of a virtual disk system operating on two nodes of a cluster according to one embodiment of the present invention is shown. In the illustrated embodiment, each node includes a user portion and a kernel. The user portion of node 104A includes a cluster membership monitor (CMM) 310A, a cluster configuration database (CCD) 311A, a client 312A, a netdisk daemon (NDD) 314A, and a cluster transport interface daemon (CTID) 316A. The kernel of node 104A includes a netdisk driver (ND) 318A, a netdisk master (NM) 320A, a cluster transport interface (CTI) 322A, a cluster connectivity monitor (CCM) 324A, a disk driver 326A and a network transport 328A. The user portion of node 104B includes a cluster membership monitor (CMM) 310B, a cluster configuration database (CCD) 311B, a netdisk daemon (NDD) 314B, and a cluster transport interface daemon (CTID) 316B. The kernel of node 104B includes a netdisk driver (ND) 318B, a netdisk master (NM) 320B, a cluster transport interface (CTI) 322B, a cluster connectivity monitor (CCM) 324B, a netdisk driver 326B and a network transport 328B.

In the illustrated embodiment, a volume manager is not included. As discussed above in reference to FIGS. 1 and 2, a volume manager may be implemented either above or below the virtual disk system. If the volume manager is implemented above the virtual disk system, client 312A interfaces to the volume manager, which in turn interfaces to ND 318A. Alternatively, if the volume manager is implemented below the virtual disk system, NM 320A interfaces to the volume manager, which in turn interfaces to disk driver 326A.

A configuration module called CTID 316A is a daemon that initializes a connection module called CTI 322A. When the configuration of the cluster changes or node 316A is initialized. CTID 316A queries CCD 311 A to obtain configuration information. In one embodiment, configuration information indicates the number of links between the nodes of the cluster and the protocol associated with the links. In one embodiment, CTID 316A additionally queries CMM 310A to obtain membership information, such as a list of active nodes in the cluster. CTID 316A establishes connections over the links between the nodes and conveys the membership information and link information to CTI 322A. CTID 316A may communicate to CTI 322A via a private interconnect and may use an I/O control request.

The links identified by CCD 311A may be physical links or virtual links. For example, CCM 324A may manage a pair of physical links as one virtual link accessible by CTI 322A. CCM 324 is discussed in more detail below in reference to FIG. 9.

CCD 311A is one instance of a distributed highly available cluster database. CCD 311 stores consistent data even in the presence of a failure. By storing mapping data in CCD 311, each node obtains the same mapping information even in the presence of a failure. CCD 311 is discussed in more detail in a co-pending, commonly assigned patent application entitled "Highly available Distributed Cluster Configuration Database" to Slaughter, et al., filed on Oct. 21, 1997, Ser. No. 08/954,796.

CMM 310 is a distributed program that monitors the cluster membership. When the membership changes, CMM 310 detects that change and conveys new membership information to other resources in the cluster such as CTID 316A and NDD 314A. Examples of membership changes include a node joining or leaving the cluster. In one embodiment, CMM 310 outputs a configuration number unique to each configuration.

NDD 314A is a daemon that initializes ND 318A when a new device is opened or during reconfiguration. Reconfiguration may occur when a node joins or leaves the cluster, or when a node fails. In one embodiment, each virtual disk device is initialized separately. In one particular embodiment, a virtual disk device is initialized by a cluster when the device is opened by that cluster, or after a reconfiguration if the virtual disk device was open prior to the reconfiguration. In this manner, not all virtual disk devices are initialized after each reconfiguration.

In one embodiment, ND 318A stores a list of devices to be opened and a list of opened devices. When a client requests a device to be opened, ND 318A adds the device to the list of devices to be opened. NDD 314A queries the list of devices to be opened. If the list includes a device to open, NDD 314A queries CCD 311A to obtain the mapping information for the identified device. NDD 314A may also query CMM 310A to obtain membership information, such as a list active nodes. NDD 314A conveys the mapping information and membership information to ND 318A. NDD 314A may communicate to ND 318A via a private interconnect and may use an I/O control request.

In one embodiment, the mapping information for a device identifies a primary and secondary node physically connected to a storage device and a disk device on those nodes corresponding to the storage device. Each pair of nodes and disks may be referred to as node/disk pairs. Based on the primary and secondary node/disk pair and the membership information, ND 318A may select a node to route a data access request for a device. Once ND 314A and CTI 322A have been initialize, the virtual disk system is ready to accept data access requests from client 312A.

Client 312A accesses the virtual devices of the virtual disk system in the same manner as it accesses storage devices. From the client's perspective, it appears that each storage device, or volume, is physically connected to the node. In the illustrated embodiment, when client 312A accesses data from a storage device, it sends a data access request to ND 318A. In one embodiment, client 312A specifies the destination storage device, the type of operation and the location to retrieve or store the data to ND 312A. The rest of the operation is transparent to client 312A. ND 318A, based on the mapping and current membership information, determines to which node to convey the data access request. In one embodiment, the mapping information obtained from CCD 311A includes a primary and secondary node physically connected to the storage device. ND 318A may route the data access request to the primary node if the primary node is active. Alternatively, if the primary node is not active, then ND 318A may route the data access request to the secondary node. Which node is used to access the storage device is transparent to client 312A.

ND 318A conveys the data access request to CTI 322A and specifies to which node to convey the data access request. How CTI 322A transfers the data access request to the destination node is transparent to ND 318A and client 312A. In one embodiment, if the storage device is directly coupled to node 104A, ND 318A conveys the data access request to NM 320A rather than CTI 322A. NM 320A conveys the data access request to disk driver 326A, which in turns accesses the storage device. In one embodiment, NM 320A is a portion of ND 318A that interfaces to disk driver 326A. Disk driver 326A interfaces to one or more storage devices physically connected to a node 104A.

CTI 322A manages a plurality of links. CTI 322A is one instance of the distributed program CTI 322. CTI 322A may manage one or more links to the destination node of a data access request. For example, if the destination node for the data access request is node 104B, CTI 322A may manage three links to that node. CTI 322A may transport all the data to node 104B via one link or may distribute the data over the three links. CTI 322A may append a field to the data access request to identify the destination client at destination node. CTI 322B of node 104B may service multiple clients. The field appended to the message by CTI 322A identifies to which client CTI 322B should route that data. For example, CTI 322A may append data to a data request received by ND 318A that specifies the destination client as ND 318B.

In one embodiment, CCM 324A manages two or more redundant physical links. From the perspective of CTI 322A, the redundant physical links appear as one logical link. CCM 324A exchanges messages over the physical links with CCM 324B. The two instances of CCM 324 reach agreement regarding which of the redundant links are operational. CMM 324 may pick one operational physical link to transfer data. If that link fails, CCM 324 may detect the failure and transfer data on the alternate link. From the perspective of CTI 322, each logical link appears as one highly available link. In one embodiment, CCM 324A manages links to each node in the cluster. For example, CMM 324A may manage links to nodes 104B and 104C.

Network transport 328A performs the protocol functions over the links of data communicate link 112. In one embodiment, a TCP/IP protocol is used over data communication link 112. In other embodiments, other protocols may be implemented. For example, a faster protocol such as Low Latency Connectivity Layer (LLCL), Message Passing Interface (MPI), or Low Overhead Communication (LOCO) may be used.

In node 104B, network transport 328B receives the data access request and transports the data using the appropriate protocol to CTI 322B. CTI 322B may partially decode the data access request to determine its destination client. In the illustrated embodiment, the data is routed to ND 318B. ND 318B may partially decode the data access request to determine the destination storage device. If the storage device is physically coupled to node 104B, ND 318B conveys the request to NM320B, which conveys the request to disk driver 326B. Disk driver 326B accesses the storage device. If the data access request is a read transaction, the requested data is routed back to client 312A via the ND 318, CTI 322 and data communication link 112.

One feature of the virtual disk system according to one embodiment of the present invention is high availability. The virtual disk system is designed such that data access requests are reliably performed in the presence of a failure, such as a node failure. Towards this end, ND 318A stores a list of pending data access requests. If a data access request is not successfully completed, the virtual disk system retries the data access request possibly to another node. The requesting node may detect an incomplete data access request by receiving a negative acknowledge signal or it may receive reconfiguration data indicating that a destination node is not active. When the data access request is successfully complete, it is removed from the list of pending data access requests.

For example, node 104B may be a primary node for a storage device and node 104C may be a secondary node for that storage device. When ND 318A conveys a data access request to the storage device, it may convey the data access request to the primary node, which is node 104B. If node 104B is unable to successfully complete the data access request, for example if the storage device path between disk driver 326B and the storage device is non-functional, node 104A may receive a negative acknowledgement signal indicating that the data access request was not successfully completed. Node 104A may then resend the data access request to the secondary node, which is node 104C. Node 104A may store information indicating that node 104B is not able to communicate with the storage device and subsequently send new data access requests to other nodes.

In an alternative example, node 104B may be non-operational. In one embodiment, the cluster membership data acquired by node 104A from CMM 310A may indicate that the node is not operational. Accordingly, ND 318A may route data access requests to the secondary node. In the above manner, data access requests are successfully completed even in the presence of a failure.

Figure 4:
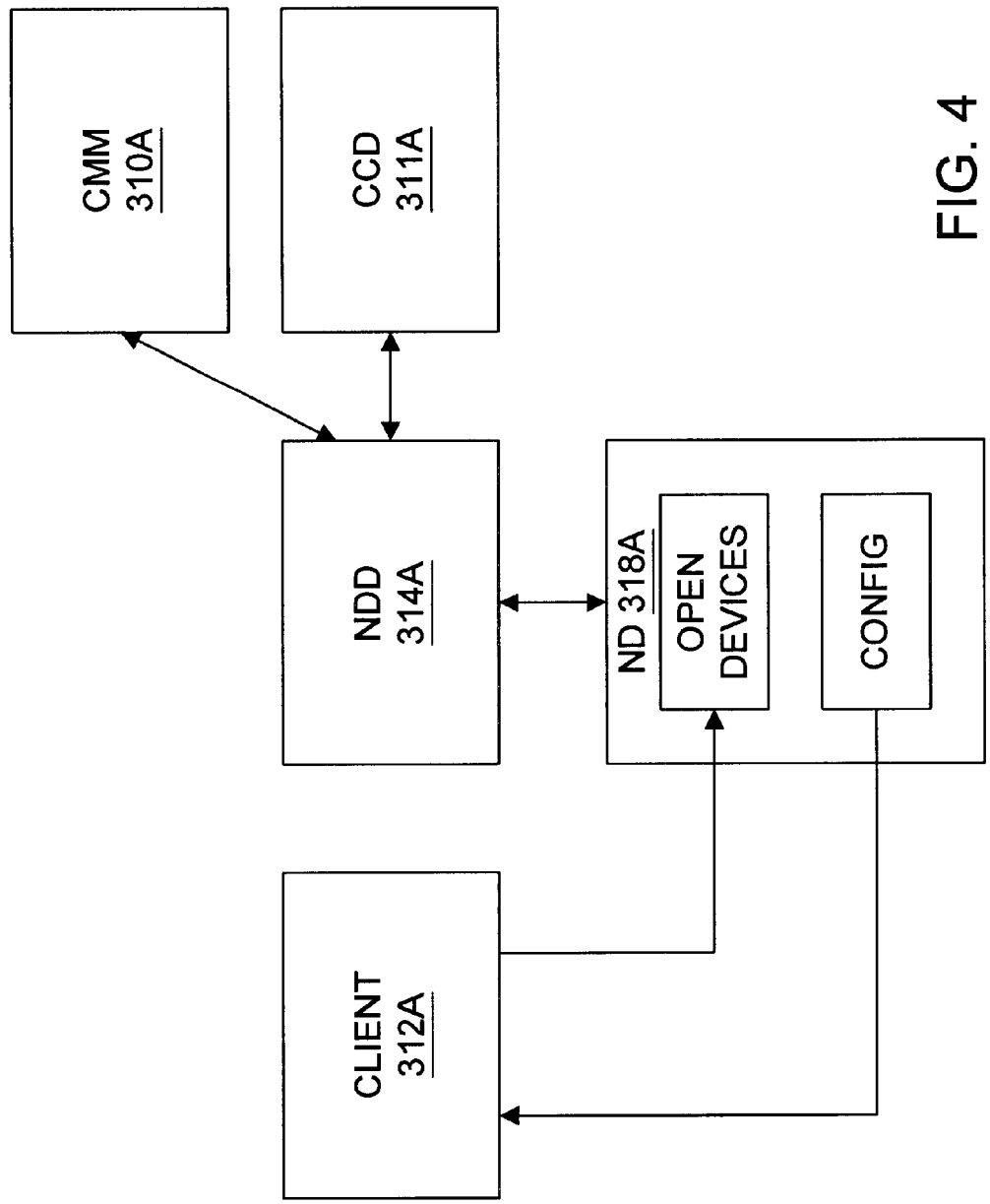
FIG. 4 is a block diagram illustrating the initialization of a netdisk driver according to one embodiment of the present invention.

Turning now to FIG. 4, a block diagram illustrating the initialization of a netdisk driver is shown according to one embodiment of the present invention. FIG. 4 illustrates the initialization of ND 318A in node 104A. The initialization of other netdisk drivers in the cluster may be performed in a substantially similar manner.

In one embodiment, prior to accessing a storage device, the storage device is opened. For example, an open command may be executed that causes the storage device to be initialized. Similarly each virtual device on each node may be opened prior to accessing it. Client 312A outputs a command to ND 318A to open a virtual device. ND 318A stores the device to be opened in a list. In one embodiment, NDD 314A periodically queries the list to determine which devices to initialize. In an alternative embodiment, ND 318A may output a signal to NDD 314A indicating that a device needs to be initialized. NDD 314A queries CCD 311A to obtain mapping information for the device to be opened, and queries CMM 310A for current membership information. NDD 314A conveys the mapping and membership information to ND 318A. ND 318A stores the mapping and membership information to a configuration file. ND 318A uses the mapping and membership data stored in the configuration file to determine the routing of data access requests to nodes. ND 318A then notifies client 312A that the device has been opened.

In one embodiment, the mapping information for each virtual device includes: the name of the virtual device, a primary node, the name of the storage device at the primary node (i.e., the name of the device that corresponds to the storage device), a secondary node and the name of the storage device at the secondary node. The mapping information may additionally include an identification number for the virtual device and a cluster-unique name for the storage device.

ND 318A additionally stores a reconfiguration number associated with the mapping and membership data. The reconfiguration number is obtained from CCM 310A. ND 318A uses the reconfiguration number to determine whether its current membership data is up to date with respect to the most recent configuration.

In one embodiment, when the configuration of the cluster changes, CMM 310A notifies NDD 314A of the new membership information. For example, if a node failure is detected, CMM 310A will notify NDD 314A that a reconfiguration has occurred and convey the new membership data to NDD 314A. NDD 314A conveys the new membership information to ND 318A, which uses the new membership information in conjunction with the mapping information to route future data access requests.

In one embodiment, a filesystem manages the virtual disks on a node. This filesystem may be called a netdisk filesystem (NDFS). NDFS is configured to create a special device file for virtual disks when a node opens the virtual disk. The special device file represents the virtual disk in the operating system.

In operating systems, such as the UNIX operating system, devices may be treated as files. The file associated with a device (called a device file or a special device filed) is normally created by an initialization program that runs during the boot-up phase of the operating system. The initialization program determines the physical devices attached to the computer system and creates device files corresponding to those physical devices. In one embodiment, virtual devices are initialized the first time they are accessed rather than during boot-up. This situation and the fact that the virtual disk may not be physically connected to the node means that the device files for the virtual disks may not be created during initialization. Because the virtual disks preferably are accessible like other devices, NDFS is configured to create device files for the virtual devices when they are first opened. In one embodiment, a device file is only created the first time a node opens a virtual device. Subsequent opens of the virtual device do not cause device files to be created.

In one embodiment, NDFS detects a command to open a virtual device. If this is the first time the virtual device has been opened, NDFS sends a creation request to ND 318A. In one embodiment, NDFS has a private interface to ND 318A. ND 318A stores the virtual device to create in a list. The list may be the same list used to store devices to open or may be a separate list for devices to create. NDD 314A may periodically query the list to determine which devices to create or ND 318A may output a signal to NDD 314A indicating a device needs to be created. NDD 314A queries CCD 311A to obtain permission data for the device to be opened. NDD 314A conveys the permission data to ND 318A which in turn conveys the permission data to NDFS. NDFS will create the device file for the device with the permission data received from CCD 311A. In one embodiment, the device is opened after the device file is created using a normal device open procedure as discussed above. Subsequent opens of the same device by the same node may result in a normal open operation without the need for NDFS to be involved. Accordingly, a performance penalty is only incurred the first time a device is opened. Subsequent commands to open the device are performed in the same manner as the opening of any other device.

Figure 5:
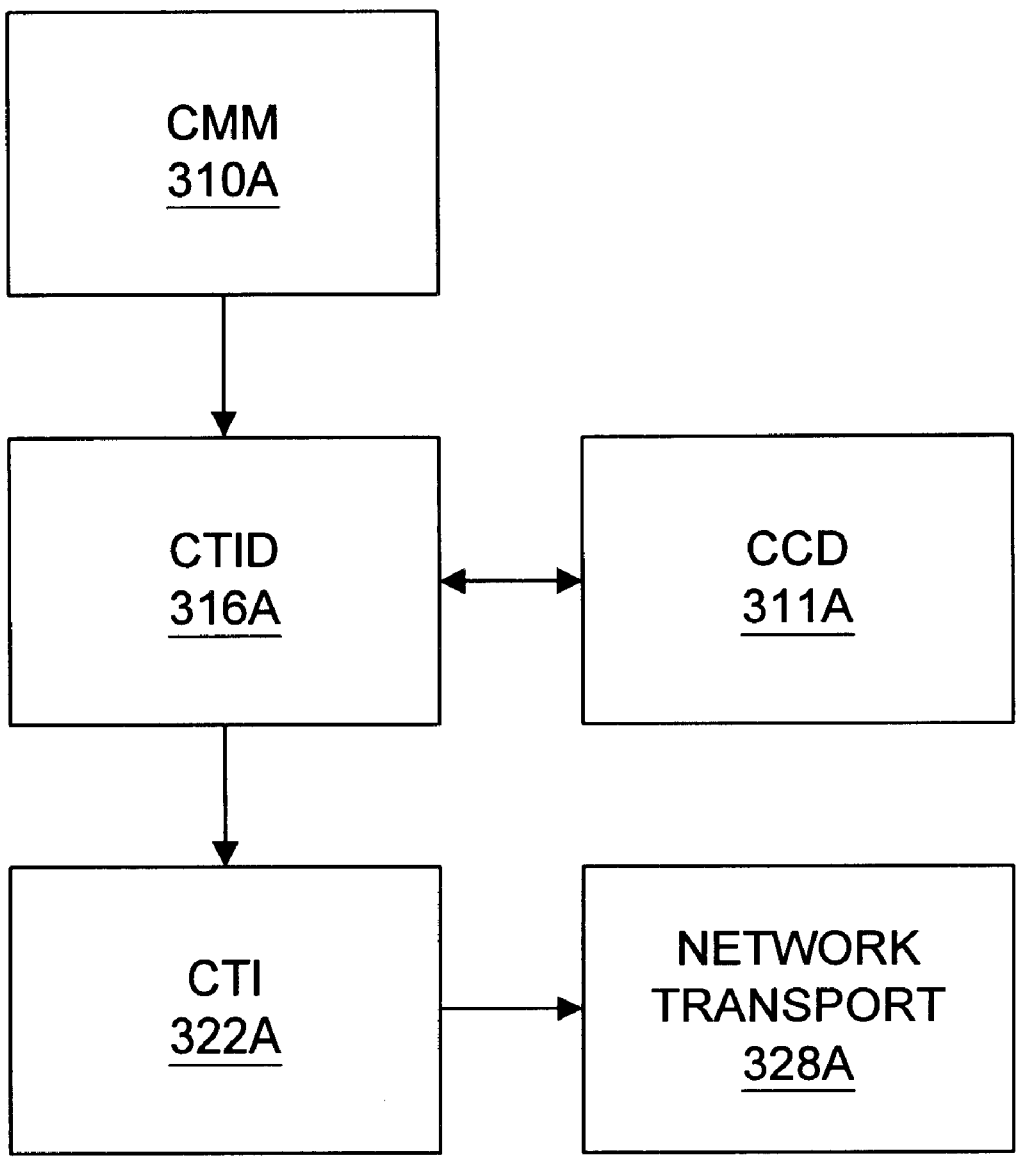
FIG. 5 is a block diagram illustrating the initialization of a cluster transport interface according to one embodiment of the present invention.

Turning now to FIG. 5, a block diagram illustrating the initialization of a cluster transport interface according to one embodiment of the present invention is shown. FIG. 5 illustrates the initialization of CTI 316A in node 104A. The initialization of other cluster transport interfaces in the cluster may be performed in a substantially similar manner.

In one embodiment, prior to transferring data over data communication link 102, CTID 316A establishes connections over the available links. During initialization, CTID 316A queries CMM 310A for data identifying the current cluster membership and queries CCD 311A for data identifying which links are connected to which nodes. In one embodiment, CCD 311A stores additional information about the links such as the transfer protocol of the links. CTID 316A establishes connections over the available links and passes the link information and membership data to CTI 322A. In one embodiment, CTID 316A establishes TCP/IP connections over the available links.

CTI 322A interfaces to network transport 328A to exchange data to other instances of CTI 322. In one embodiment, network transport 328A interfaces to CCM 324A, which manages one or more redundant links. When CTI 322A receives a data access request destined for a particular node, it determines which connections connect the requesting node to the destination node. CTI 322A determines on which connection(s), to transport the data to the destination node. For example, if CTI 322A manages connections over three links to node 104B and it receives a data access request destined for that node, it may transfer all the data via one connection or it may transfer a portion of the data over each of the three connections.

When the cluster is reconfigured, CMM 310A notifies CTID 316A of the event. CTID 316A obtains the new membership data from CCD 311A and conveys the new membership data and a new configuration number to CTI 322A. Additionally, CTID 316A may obtain link data from CCD 311A and conveys that data to CTI 322A. CTID 322A may modify the connections when a reconfiguration occurs. For example, CTID 322A may establish connections over links to new nodes in the cluster, or may abandon connections to nodes that leave the cluster.

Figure 6A:
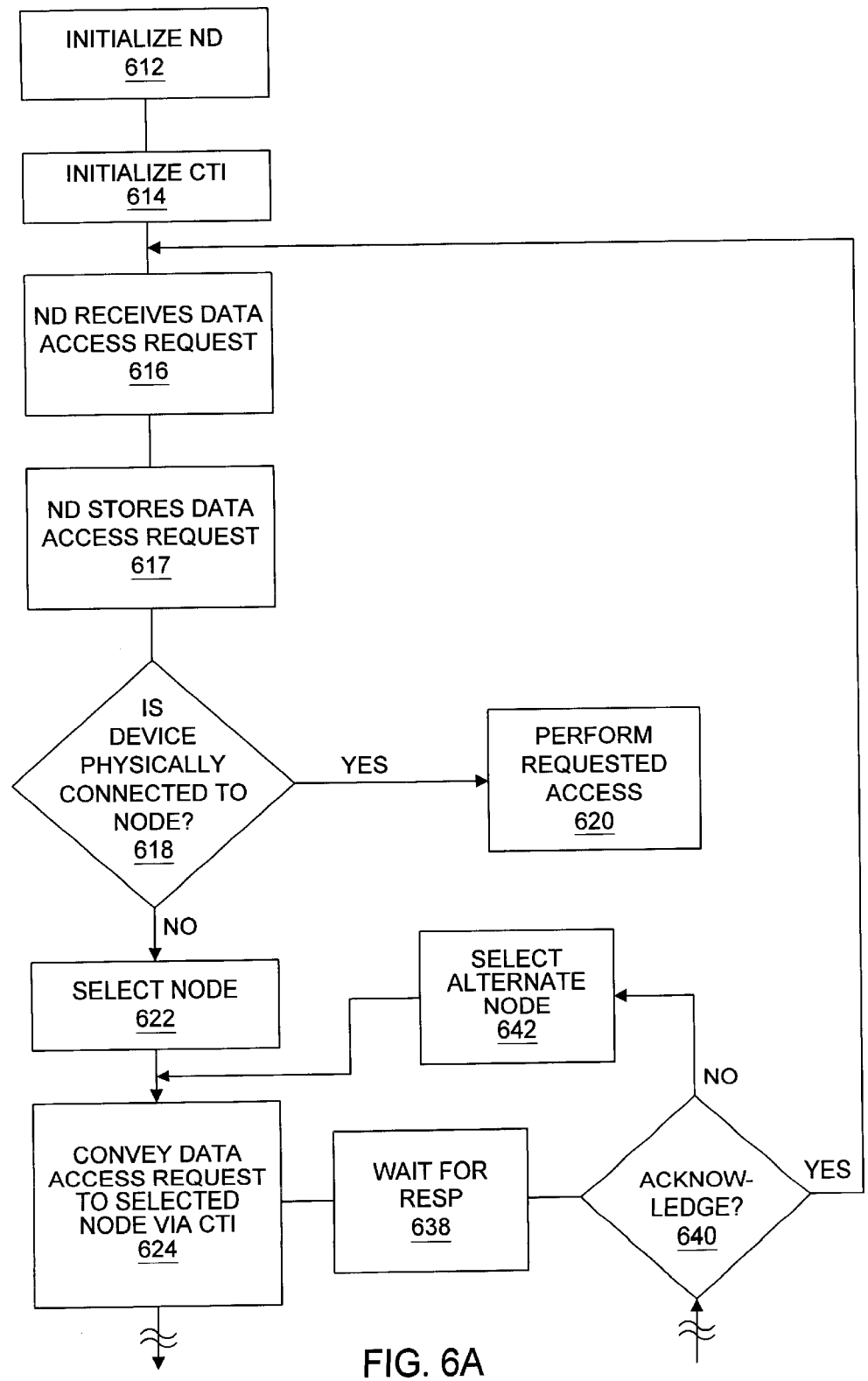
FIG. 6 is a flowchart diagram illustrating the operation of a virtual disk system according to one embodiment of the present invention.
Figure 6B:
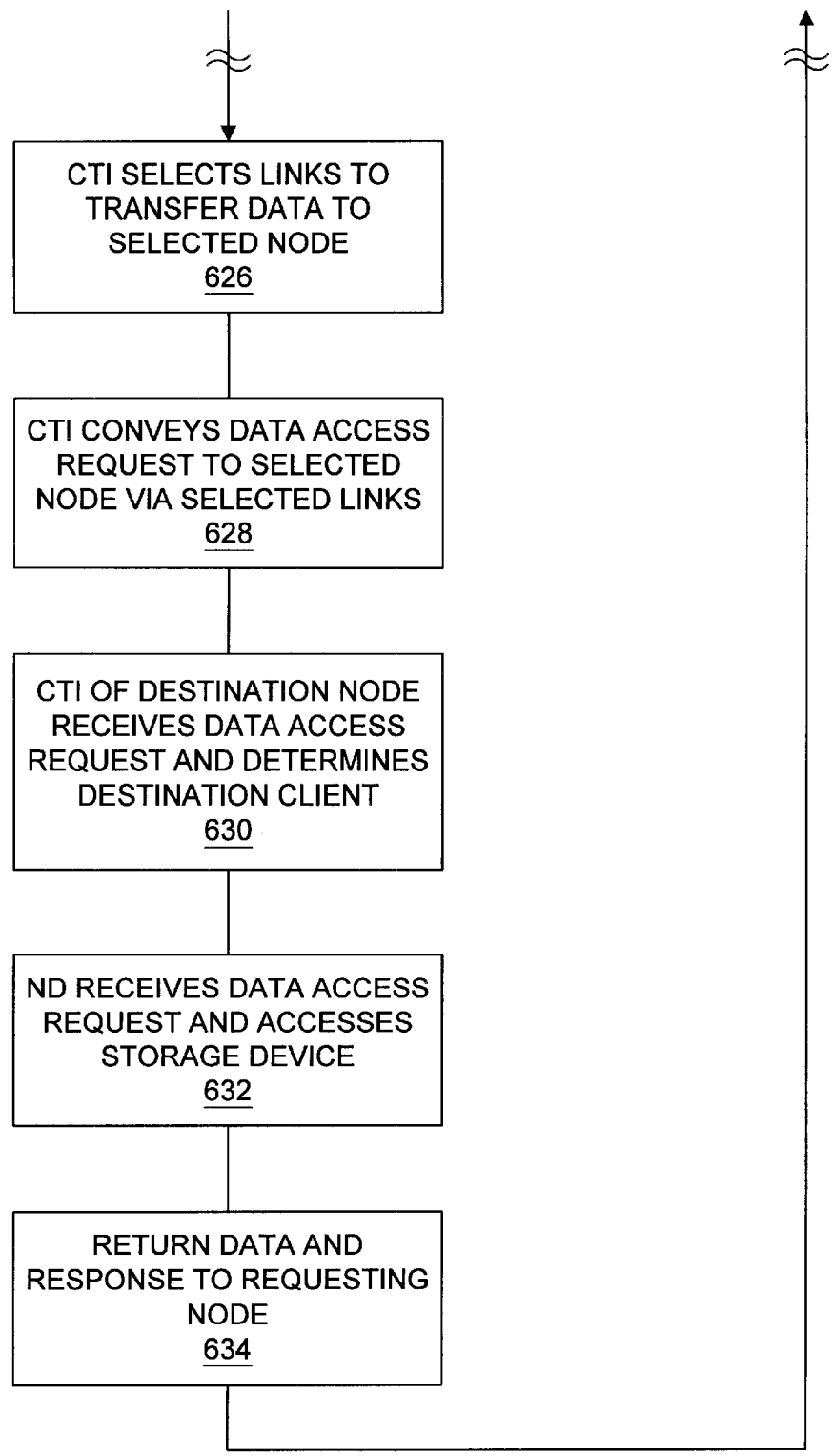

Turning now to FIG. 6, a flowchart diagram illustrating the operation of a virtual disk system according to one embodiment of the present invention is shown. In step 612, a netdisk driver is initialized The initialization of the netdisk driver is discussed in more detail in reference to FIG. 7. In step 614, a cluster transport interface is initialized. The initialization of the cluster transport interface is discussed in more detailed in reference to FIG. 8. In step 616, the netdisk driver receives a data access request from a client. In step 617, the netdisk driver stores the data access request and any other data necessary to re-issue the data access request if it is not successfully completed.

In step 618, the netdisk driver that receives the data access request determines whether the destination device is physically connected to the requesting node. If the destination device is physically connected to the requesting node, then in step 620 the netdisk driver performs the data access request on the storage device. Alternatively, if the storage device is not physically connected to the requesting node, then in step 620 the netdisk driver detects a node to which to convey the data access request. In one embodiment, the netdisk driver stores mapping information identifying a primary and secondary node for each storage device. In one particular embodiment, the netdisk driver selects the primary or secondary node based upon membership data and/or previous unsuccessful data access requests. In step 624, the netdisk driver conveys the data access request to the selected destination node via the cluster transport interface.

In step 626, the cluster transport interface selects one or more connections to transfer data to the destination node by the netdisk driver. In step 628, the cluster transport interface conveys the data access request to the destination node via the selected connection(s). In step 630, the cluster transport interface at the destination node receives the data access request and determines the destination client, which in the instant example is the netdisk driver, or more particularly the netdisk master. In step 632, the netdisk master receives the data access request and accesses the destination storage device. In step 634, the cluster transport interface of the destination node returns an acknowledge or not acknowledge signal to the requesting node. If the data access request is a read request, the requested data may also be returned to the requesting node.

In parallel with the transfer of the data access request, in step 638, the requesting node waits for a status signal from the destination node. The status signal may take the form of an acknowledge or a not acknowledge signal. In step 640, it is determined whether or not an acknowledge was received. If an acknowledge signal is received, then operation continues at step 616. Alternatively, if a not acknowledge signal is received, then in step 642 an alternate node to convey the data access request is selected and operation continues at step 624.

Figure 7:
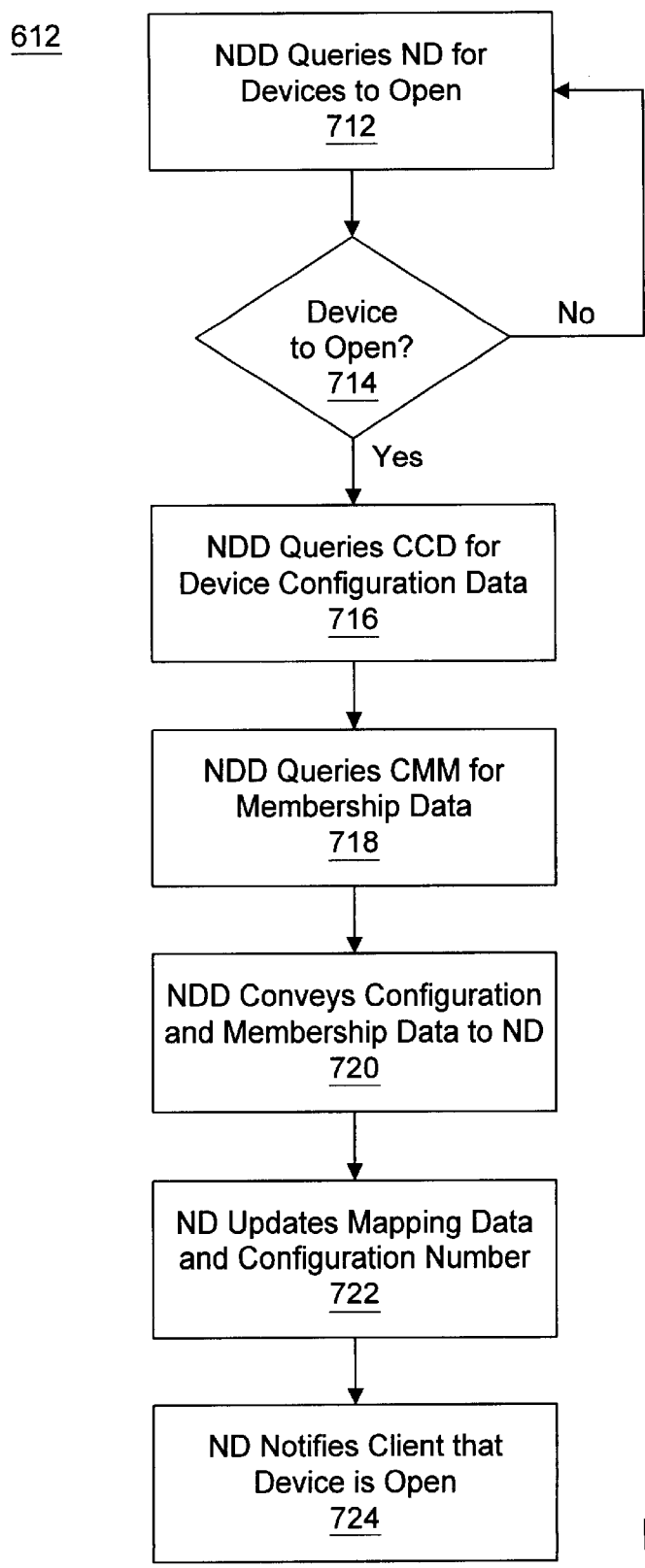
FIG. 7 is a flowchart diagram illustrating the initiation of a netdisk driver according to one embodiment of the present invention.

Turning now to FIG. 7, a flowchart diagram illustrating the initialization of a netdisk driver according to one embodiment of the present invention is shown. In step 712, the netdisk daemon queries that netdisk driver for devices to open. In decisional step 714, it is determined whether any devices need to be opened. If no devices need to be opened, execution continues at step 712. Alternatively, if the netdisk daemon detects a device to open, then in step 716 the netdisk daemon queries the cluster configuration database for mapping data. The mapping data may identify node/disk pairs mapped to a virtual device. In step 718, the netdisk daemon queries the cluster membership monitor for membership data.

In step 720, the netdisk daemon conveys the mapping and membership data to the netdisk driver. In step 722, the netdisk driver updates the mapping information for the device, updates that membership information and records the reconfiguration number. In step 724, the netdisk driver notifies the client that the requested device is open.

Figure 8:
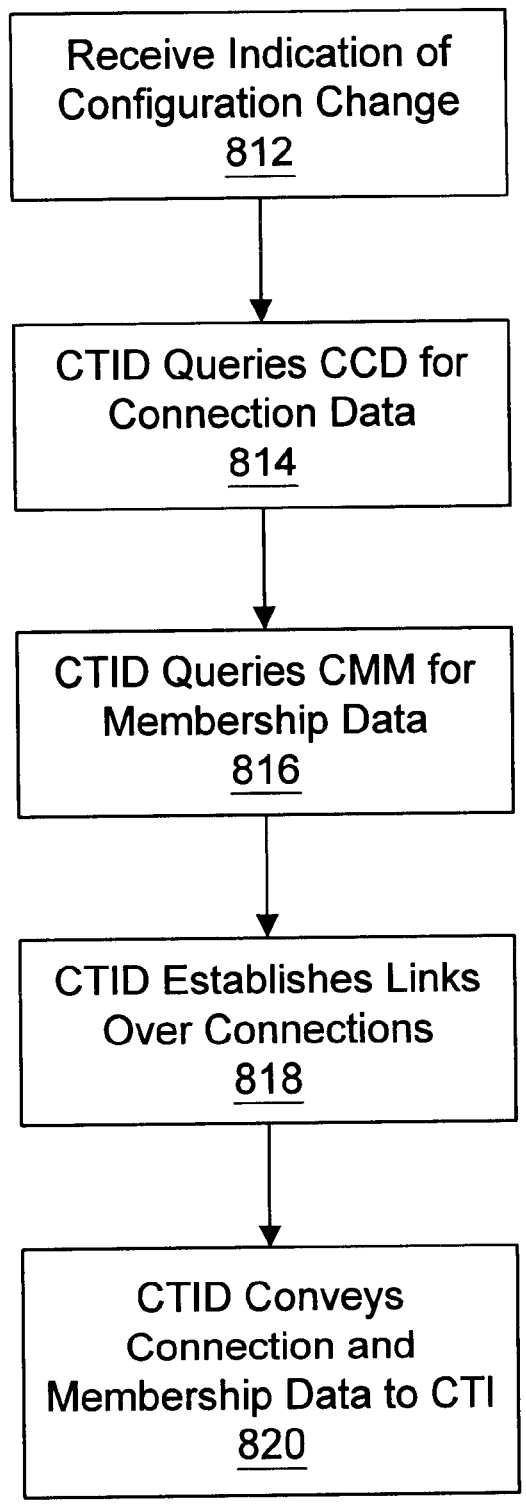
FIG. 8 is a flowchart diagram illustrating the initiation of a cluster transport interface according to one embodiment of the present invention.

Turning now to FIG. 8, a flowchart diagram illustrating the initialization of a cluster transport interface according to one embodiment of the present invention is shown. In step 812, a cluster transport interface daemon receives an indication of a configuration change. Alternatively, the cluster transport daemon may receive an indication of a system initialization. In step 814, the cluster transport interface daemon queries the cluster configuration database for link information. In one embodiment, link information may include the number of links between nodes within a cluster, which links are coupled to which nodes, and information such as the protocol used by the links. In step 816, the cluster transport interface daemon queries the cluster membership monitor for membership information.

In step 818, the cluster transport interface establishes connections over the links. In step 820, the cluster transport interface daemon conveys the link and membership information to the cluster transport interface. The cluster transport interface is then ready to accept data access requests or other messages.

Figure 9:
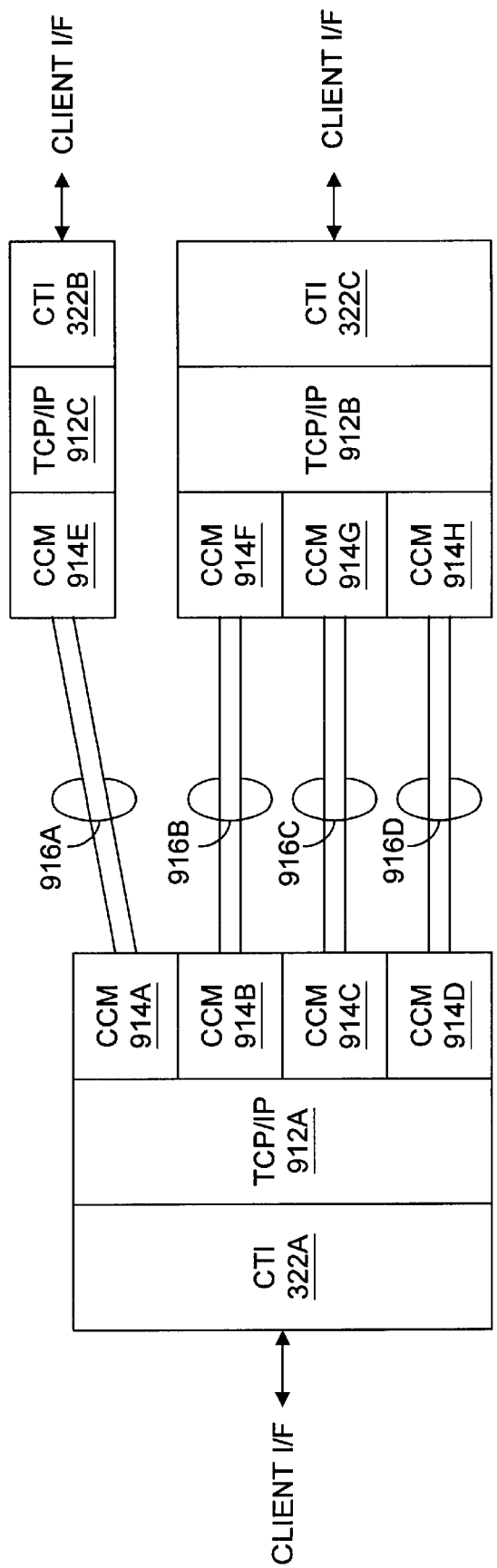
FIG. 9 is a block diagram of a cluster transport interface according to one embodiment of the present invention.

Turning now to FIG. 9, a block diagram of the cluster transport interface according one embodiment of present invention is shown. A cluster transport interface is one example of a data transport system. FIG. 9 includes three instances of a cluster transport interface (322A–322C), three TCP/IP interfaces (912A–912C), and eight cluster connection monitors (914A–914H). CTI 322 is a distributed software program that provides a facility for passing messages between nodes. The messages may include control messages and data blocks.

The instances of cluster transport interface 322 pass data between client programs. For example, CTI 322A may receive a message from a netdisk driver that is a client to CTI 322A. In one embodiment, the message specifies its destination node and a disk device on that node. CTI 322A determines which links are connected to the destination node and conveys the message over one of those links. The cluster transport interface at the destination node receives the data access request, determines the destination client and conveys the data to the destination client. For example, CTI 322A may route a data access request from the netdisk driver in node 104A to the netdisk driver in node 104B. CTI 322B receives the data access request, determines the destination client and conveys the data access request to the netdisk driver in node 104B. From the perspective of a client, CTI 322A appears as one virtual link to the destination node.

In the illustrated embodiment, CTI 322 uses TCP/IP for transferring data to other nodes. CTID 316A automatically establishes a TCP/IP connection over each link during initialization. CTI 322 conveys a message to TCP/IP 912A which transfers the message to the appropriate instance of CCM 914. CTI 322A, however, is not dependent upon any particular data transfer protocol. By modifying TCP/IP 912 and/or CCM 914, CTI 322 may interface to any data transport interface or transfer protocol.

In one embodiment, CTI 322A allocates memory for storing messages and data received from other nodes and deallocates the memory when the data are no longer required by a client. In one embodiment, CTI 322 uses a call-back function to indicate to a client that data have been received. For example, CTI 322A may convey a read request to node 104B. When CTI 322A receives the requested data it uses a call-back function to the requesting client to indicate the data are available.

Cluster connection monitor (CCM) 914 manages two or more physical links as one logical link. In the illustrated embodiment, a pair of instances of CCM 914 manages two links. In alternative embodiments, a pair of instances of CCM 914 may manage more links. Pairs of physical links connect one node in the cluster to another node. For example, links 916A couple node 104A to node 104B, and links 916B couple node 104A to node 104C. In one embodiment, the links are handled as redundant links by CMM 914. Data is transferred on one link until a failure of that link is detected and then data is transferred on the other link.

CCM 914 determines which links are operational and detects failures by exchanging messages, sometimes called heartbeat messages, over both physical links. For example, CCM 914A and CCM 914E exchange heartbeat messages to determine whether physical links 916A are operational. The two instances of CCM 914 select one of the physical links as the primary link. If the primary link fails, CCM 916 detects the failure and begins transferring data on the other physical link. In one particular embodiment, CCM 916 exchanges Unreliable Data Protocol (UDP) messages across a physical link to determine whether the link is operational.

From the perspective of CTI 322, each pair of physical links managed by CCM 914 appears as one logical link. Accordingly, the data transferred by CTI 322A may be transferred on one of the two physical links transparent to CTI 322A.

In the illustrated embodiment, three logical links (916B–916D) connect node 104A to node 104C. CTI 322A determines on which of the three links to transfer the data. In one embodiment, CTI 322A may transfer all the data on one logical link. In alternative embodiment, CTI 322A may transfer a portion of the data on each logical link. As noted above, it is transparent to the client on which or how many logical links the data are transferred.

Figure 10:
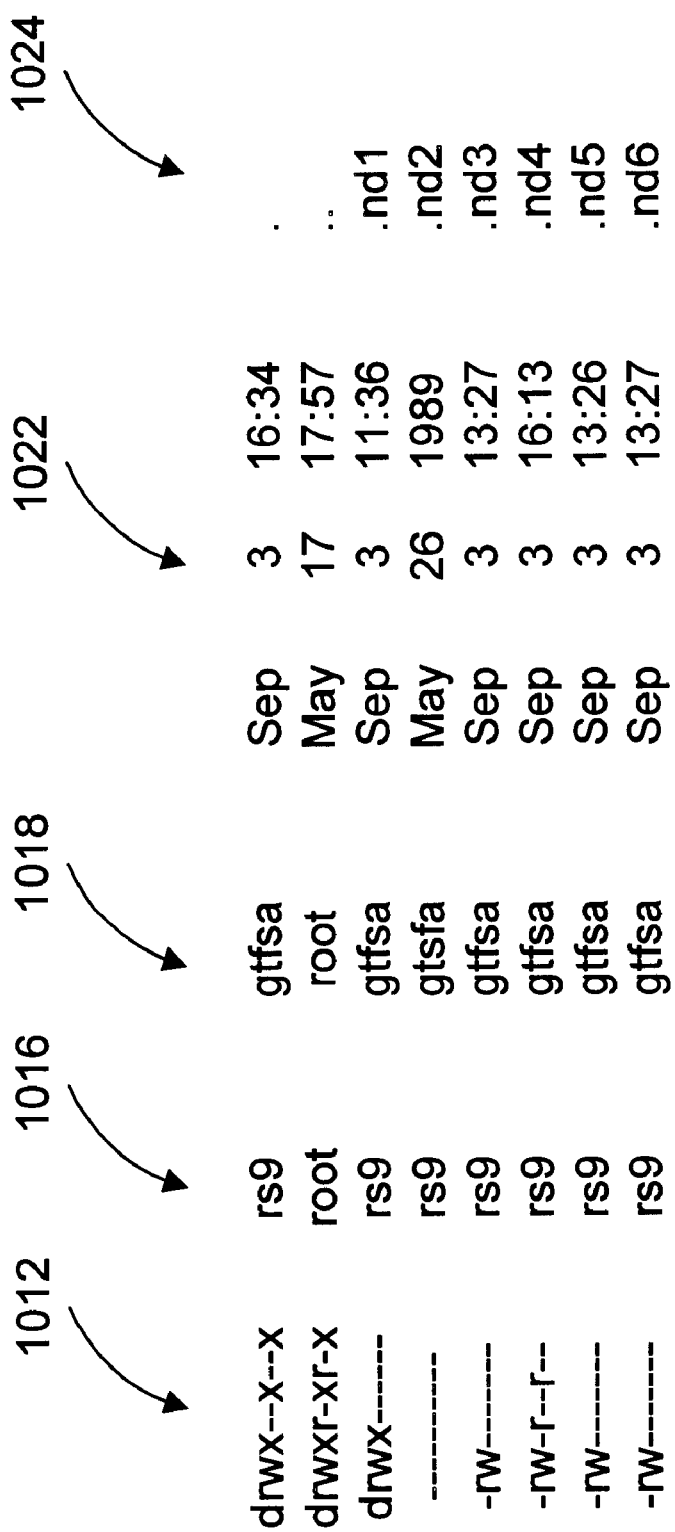
FIG. 10 is a diagram illustrating permission data according to one embodiment of the present invention.

Turning now to FIG. 10, a diagram illustrating device permissions according to one embodiment of the present invention is shown. The permission data are shown in the context of a listing of a directory. A similar listing may be obtained by performing an "ls-l" command on a directory that lists raw virtual disk devices. It is noted that the device permissions are related to the devices themselves, not to the files or directories on those devices. The raw devices (i.e., devices with no filesystem or files on them) are treated as files for permission purposes.

Field 1012 includes ten characters. The first character is either a "d", which identifies a directory, or a "-", which identifies a device. The next nine characters are three groups of three characters. Each group represents the permission modes for a owner, a group and others, respectively. The permission modes include read (r), write (w) and execute (x). One character in each group represents each permission mode. If a letter representing the permission mode is present, then the associated user has that permission. Alternatively, if a "-" is present, the associated user does not have that permission. For example, if a user has the following permissions "rwx" then the user has read, write and execute permission. Alternatively, if the user has the following permissions "r--" then the user has read permission, but not write or execute permission. The first group of three characters represents the permissions for the owner of the device. The second group of three characters represents the permissions for a group associated with the device. The last group of three characters represents the permissions for other users. Owners and groups are discussed in more detail below. For example, if the permissions in field 1012 are "drwx--x--x", the field represents a directory, the owner has read, write and execute permission, and the group and others have execute permission only.

Field 1016 identifies the owner of the entry. The owner is the user that created the device. Field 1018 identifies a group of related users. Groups are defined within the operating system. Field 1018 associates one of the defined groups with the device. Other users that are neither the owner nor within the selected group. As discussed above, different permissions may be defined for the owner, group and other users.

Field 1022 identifies the date and time of the last modification of the device. If the last modification is within the current calendar year, the month, day and time are specified. Alternatively, if the last modification is not within the current calendar year, the month, day and year are specified. Field 1024 identifies the name of the device.

To ensure consistent permission data among the nodes of the cluster, the permission data may be stored in a highly available database. In one embodiment, multiple nodes within a cluster have representations of a device. To maintain consistent permission data among the nodes even in the presence of a failure, the permission data is stored in a cluster configuration database (CCD).

In one embodiment, when a node first opens a virtual device, the permission data for that device are read from the CCD and a device file is created with the permission data. In one embodiment, the device file is only created the first time a virtual device is opened by a node. In one embodiment, a filesystem operating on each node includes a daemon that queries the CCD for permission data of the device. The daemon returns the permission data to the filesystem, which creates a special device file with those permissions. Because the CCD may be queried by any node of the cluster and returns consistent information even in the presence of a failure, all nodes will have consistent permission data.

Figure 11:
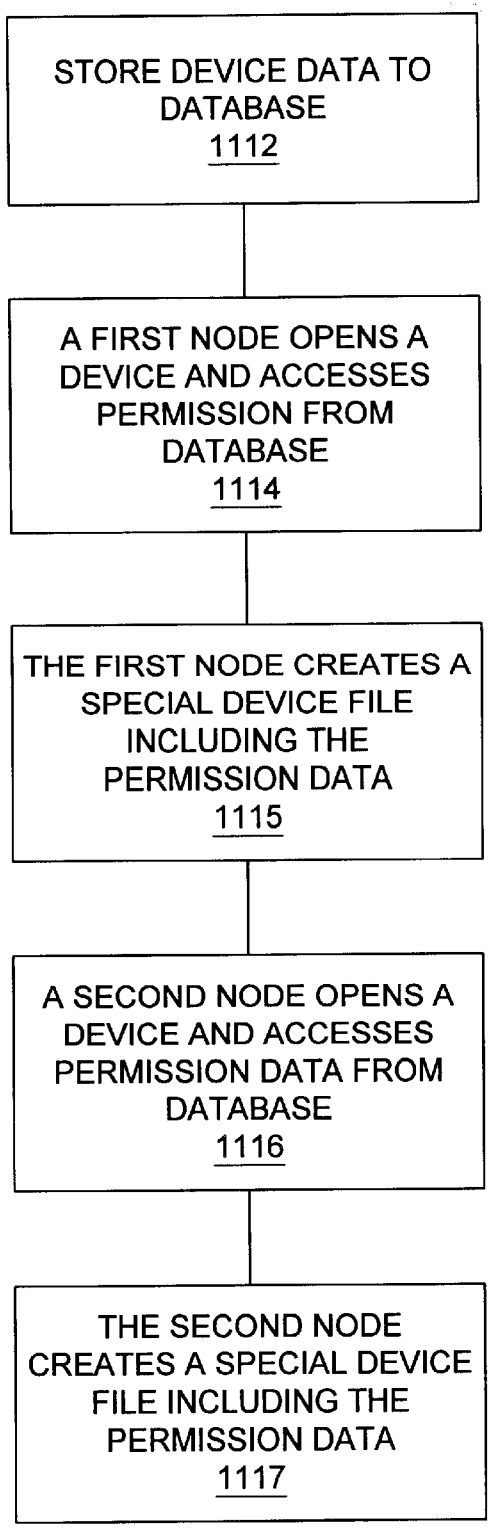
FIG. 11 is a flowchart diagram illustrating the storage and access of consistent permission data according to one embodiment of the present invention.

Turning now to FIG. 11, a flowchart diagram illustrating the storage and access of consistent permission data according to one embodiment of present invention is shown. In step 1112, permission data are stored to a highly available database. In one embodiment, the permission data include device permissions, the owner of the device, and the group associated with the device. In step 1114, a first node opens a device on a first node and accesses the permission data from the highly available database. In step 1115, the node opens a special device file for the device including the permission data. In step 1116, a second node opens a device corresponding to the same physical device on a second node and accesses the permission data. In step 1117, the node opens a special device file for the device including the permission data on the second node. Because the highly available database returns consistent data, the nodes receive consistent permission data.

Figure 12:
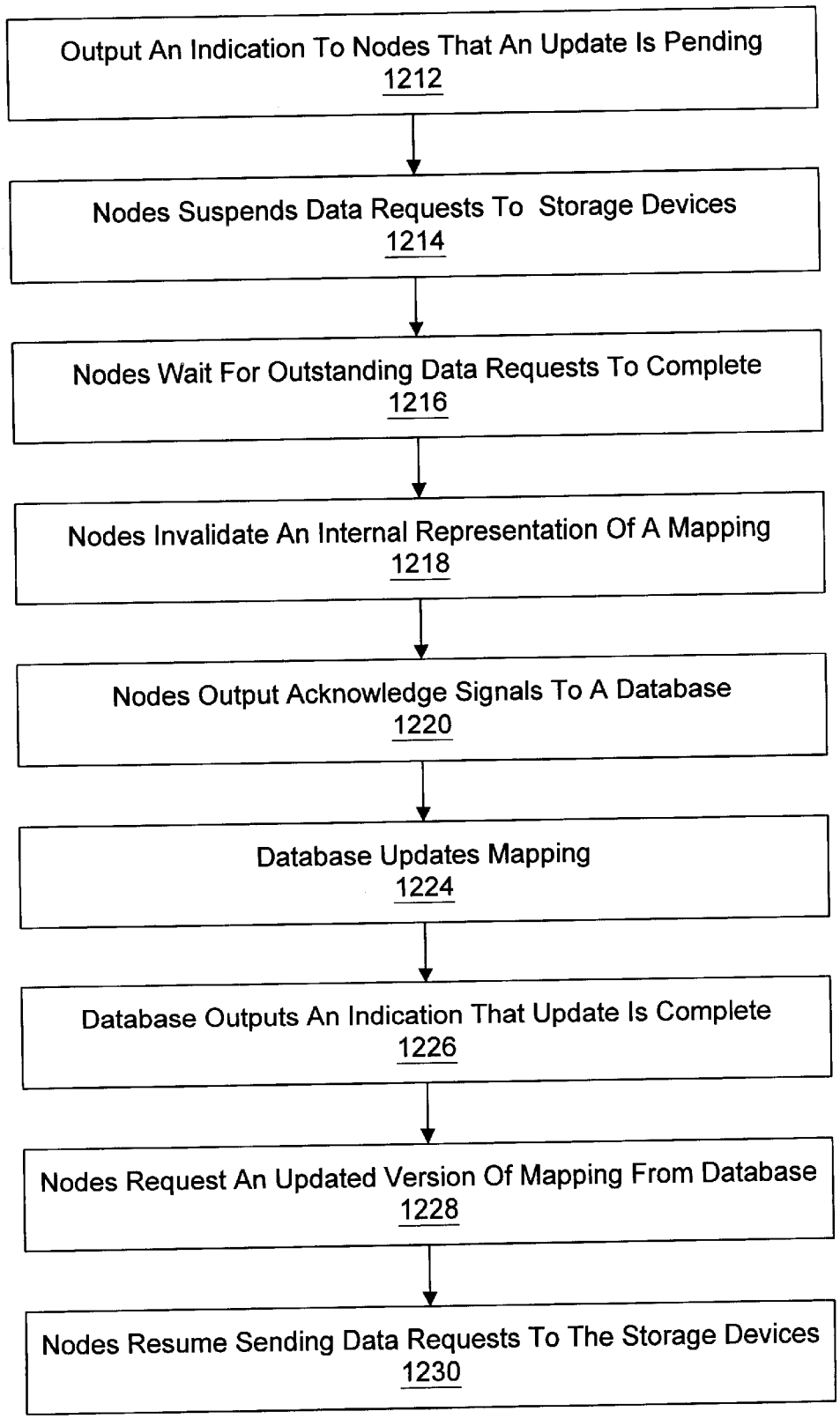
FIG. 12 is a flowchart diagram illustrating the update of a configuration mapping according to one embodiment of the present invention.

Turning now to FIG. 12, a flowchart diagram illustrating the update of a configuration mapping according to one embodiment of the present invention is shown. In step 1212, an indication that an update is pending is provided to the nodes. In step 1214, the nodes suspend data access requests to the storage devices. In step 1216, the nodes wait for outstanding data access requests to complete. In step 1218, the nodes invalidate an internal representation of a mapping of virtual disks to storage devices. In step 1220, the nodes output acknowledge signals indicating that the internal mapping representations have been invalidated, data access requests have been suspended, and outstanding data access requests have completed. In step 1222, the system waits for acknowledge signals from all active nodes. In step 1224, the system updates its mapping. In step 1226, the system outputs an indication that the update is complete. In step 1228, the nodes request an updated version of the mapping. In step 1230, the nodes resume sending data access requests to storage devices.

In one embodiment, the update procedure is coordinated by a cluster configuration database (CCD). To prevent errors, the mapping should be updated consistently among all the nodes. The CCD notifies the nodes of a pending update and notifies the nodes that the update is complete via a synchronization command. In one embodiment, the synchronization command is run whenever a row in the CCD is modified. The command to run during modification of a row in the CCD may be specified in a format row associated with the data stored in the CCD. The synchronization command may be run in parallel on all the nodes of the cluster. In one embodiment, a netdisk synchronization command is run when the netdisk mapping is modified. A different invocation of the netdisk synchronization command may be run depending upon the type of the modification. The CCD outputs a first synchronization command prior to modifying the mapping. A second synchronization command may be run after the database is updated.

In one embodiment, if an acknowledge signal is not received from all nodes, the cluster will suspend the update and output a cancel signal. In one embodiment, the cancel signal causes the node to revalidate the internal mapping representations and continue operating.

In the above described manner, the configuration of a cluster can be modified while the cluster is operating without losing data. The data access requests in the system may be delayed, but they will proceed without error. The above described reconfiguration procedure also allows connections to be reconfigured without losing data. For example, a storage device can be disconnected from one node and reconnected to another node. The physical reconfiguration may occur between steps 1222 and 1224. Further, the reconfiguration is transparent to the client except for a delay. Another application of the above described reconfiguration is to change the mapping (or administration) of the volume manager during operation.

Numerous variations and modifications will become apparent to those skilled in the art once the above disclosure is fully appreciated. It is intended that the following claims be interpreted to embrace all such variations and modifications.

What is claimed is:

1. A distributed computing system comprising:
    a plurality of nodes coupled via a communication link, wherein the plurality of nodes comprises a first node and a subset of the plurality of nodes exclusive of the first node, and wherein the communication link comprises a plurality of node-to-node links;
    a storage device configured to store data and physically connected to at least one of the subset of the plurality of nodes, wherein the storage device is not physically connected to the first node;
    wherein the first node comprises:
        a configuration module coupled to receive membership information and configuration information, wherein the membership information includes a list of active nodes of the plurality of nodes, and wherein the configuration information includes a list of the node-to-node links, and wherein the configuration module is configured to establish connections between the first node and other active nodes of the plurality of nodes via the node-to-node links dependent upon the membership information;
        a connection module coupled to receive the membership information and the configuration information from the configuration module and a routed client data access request, wherein the routed client data access request is directed to an active one of the subset of the plurality of nodes physically connected to the storage device, and wherein the connection module is configured to convey the routed client data access request to the active one of the subset of the plurality of nodes via at least one of the node-to-node links; and
    wherein when the membership information changes, the configuration module is configured to receive updated membership information, to provide the updated membership information to the connection module, and to establish connections between the first node and other active nodes of the plurality of nodes via the node-to-node links dependent upon the updated membership information.

2. The distributed computing system of claim 1 wherein said configuration module receives the configuration information from a configuration database.

3. The distributed computing system of claim 2 wherein each of the plurality of nodes is configured to store and maintain an instance of the configuration database.

4. The distributed computing system of claim 3 wherein the configuration database stores consistent data in the presence of a node failure.

5. The distributed computing system of claim 1 wherein said configuration module is a daemon.

6. The distributed computing system of claim 5 wherein said connection module is a kernel module.

7. The distributed computing system of claim 1 wherein said configuration module and said connection module communicate via a private interface.

8. The distributed computing system of claim 1 wherein each of the node-to-node links is a physical link coupling one node of the plurality of nodes to another node of the plurality of nodes, and wherein multiple node-to-node links couple said first node to a second node of the plurality of nodes, and wherein said configuration module manages said multiple node-to-node links as one virtual link.

9. The distributed computing system of claim 1 wherein said distributed computing system includes multiple clients.

10. The distributed computing system of claim 7 wherein said multiple clients send and receive messages between said nodes.

11. The distributed computing system of claim 10 wherein said configuration module notifies a client of the first node of a message received from another active node of the plurality of nodes via a call-back function.

12. The distributed computing system of claim 1 wherein the connection module conveys the routed client data access request to the active one of the subset of the plurality of nodes via at least one message.

13. The distributed computing system of claim 12 wherein each of the at least one messages includes a control message and a data portion.

14. The distributed computing system of claim 1 wherein said connection module allocates and frees storage space for messages.

15. The distributed computing system of claim 14 wherein a client of the first node notifies said connection module when data from a message is no longer required and said connection module frees storage space associated with said message.

16. A method of transporting data in a distributed computing system comprising a plurality of nodes and a data communication bus, the method comprising:
   determining physical resources in said distributed computing system, wherein said physical resources include active nodes of said distributed computing system and active links between said active nodes;
   establishing a connection over each of said active links;
   receiving a data access request to convey data to a first of said active nodes;
   conveying said data over one or more of said active links to said first active node;
   determining that said physical resources have changed; and
   reestablishing connections to said changed physical resources;
   wherein said determination of changed resources and said reestablishing of links are transparent to a client.

17. The method of claim 16 wherein multiple links between active nodes are handled as one logical link.

18. The method of claim 16 wherein said determining of physical resources is performed by a daemon module.

19. The method of claim 18 wherein establishing a connection over said active links is performed by a daemon module.

20. The method of claim 19 wherein conveying said data to said active nodes is performed by a kernel module.

21. The method of claim 16 wherein multiple clients are supported, wherein said data conveyed to said active nodes includes an identification of a client that requested the data access request.

22. The method of claim 16 wherein said conveyed data includes a control portion and a data portion.

23. The method of claim 16 further comprising:
   allocating memory space to store said data conveyed to an active node; and
   freeing said memory space.

24. The method of claim 17 further comprising notifying a client at a destination node of the receipt of data directed to said client.

25. The method for claim 17 wherein determining physical resources includes accessing a highly available database that stores a list of physical resources.

26. The method of claim 25 wherein said highly available database is accessible by said active nodes, whereby said active nodes have consistent configuration data.

27. A computer-readable storage medium comprising program instructions for transporting data in a distributed computing system comprising a plurality of nodes and a data communication link, wherein said program instructions execute on a said plurality of nodes of said distributed computing system and said program instructions are operable to implement the steps of:
   determining physical resources in said distributed computing system, wherein said physical resources include active nodes of said distributed computing system and active links between said active nodes;
   establishing a connection over each of said active links;
   receiving a data access request to convey data to a first of said active nodes;
   conveying said data over one or more of said active links to said first active node;
   determining that said physical resources have changed; and
   reestablishing connections to said changed physical resources;
   wherein said determination of changed resources and said reestablishing of connections are transparent to a client.

28. The computer-readable storage medium of claim 27 wherein multiple links between active nodes are handled as one logical link.

29. The computer-readable storage medium of claim 27 wherein said determining of physical resources is performed by a daemon module.

30. The computer-readable storage medium of claim 29 wherein establishing a connection over said active links is performed by a daemon module.

31. The computer-readable storage medium of claim 30 wherein conveying said data to said active nodes is performed by a kernel module.

32. The computer-readable storage medium of claim 27 further comprising:
   allocating memory space to store said data conveyed to an active node; and
   freeing said memory space.

33. The computer-readable storage medium of claim 27 further comprising notifying a client at a destination node of the receipt of data directed to said client.

34. The computer-readable storage medium of claim 28 wherein determining physical resources includes accessing a highly available database that stores a list of physical resources.

35. The computer-readable storage medium of claim 34 wherein said highly available database is accessible by said active nodes, whereby said active nodes have consistent configuration data.

36. The distributed computing system of claim 1 wherein the first node further comprises:
   a netdisk driver coupled to receive mapping data, the membership data, and a client data access request directed to the storage device, wherein the netdisk driver is configured to route the client data access request to an active one of the subset of the plurality of nodes physically connected to the storage device dependent upon the mapping data and the membership data, thereby producing the routed data access request.

37. A distributed computing system comprising:
   a plurality of nodes coupled via a communication link, wherein the plurality of nodes comprises a first node and a subset of the plurality of nodes exclusive of the first node, and wherein the communication link comprises a plurality of node-to-node links;
   a storage device configured to store data and physically connected to at least one of the subset of the plurality of nodes, wherein the storage device is not physically connected to the first node;
   wherein the first node comprises:
      a configuration module coupled to receive membership information and configuration information, wherein the membership information includes a list of active nodes of the plurality of nodes, and wherein the configuration information includes a list of the node-to-node links, wherein the configuration module is configured to establish connections between the first node and other active nodes of the plurality of nodes via the node-to-node links dependent upon the membership information;

a netdisk driver coupled to receive mapping data, the membership data, and a client data access request directed to the storage device, wherein the netdisk driver is configured to route the client data access request to an active one of the subset of the plurality of nodes physically connected to the storage device dependent upon the mapping data and the membership data, thereby producing a routed data access request;

a connection module coupled to receive the membership information and the configuration information from the configuration module and the routed client data access request from the netdisk driver, wherein the connection module is configured to convey the routed client data access request to the active one of the subset of the plurality of nodes via at least one of the node-to-node links; and wherein when the membership information changes, the configuration module is configured to receive updated membership information, to provide the updated membership information to the connection module, and to establish connections between the first node and other active nodes of the plurality of nodes via the node-to-node links dependent upon the updated membership information.

38. The distributed computing system of claim 38 wherein the configuration module receives the configuration information from a configuration database, and wherein each of the plurality of nodes is configured to store and maintain an instance of the configuration database.

39. The distributed computing system of claim 38 wherein each of the node-to-node links is a physical link coupling one node of the plurality of nodes to another node of the plurality of nodes, and wherein multiple node-to-node links couple the first node to a second node of the plurality of nodes, and wherein the configuration module manages the multiple node-to-node links as one virtual link.

* * * * *